United States Patent [19]

Takata et al.

[11] Patent Number: 5,045,581

[45] Date of Patent: Sep. 3, 1991

[54] BUTADIENE POLYMER COMPOSITION CONTAINING PHENOLIC COMPOUND AND PHOSPHORUS-CONTAINING COMPOUND

[75] Inventors: Takeshi Takata, Nishinomiya; Shinichi Yachigo, Toyonaka; Manji Sasaki, Ibaraki; Kikumitsu Inoue, Nishinomiya; Shinya Tanaka, Takarazuka, all of Japan

[73] Assignee: Sumitomo Chemical Company, Limited, Osaka, Japan

[21] Appl. No.: 287,287

[22] Filed: Dec. 21, 1988

[30] Foreign Application Priority Data

Dec. 26, 1987 [JP] Japan ................ 62-331288

[51] Int. Cl.⁵ .......................... C08K 5/524
[52] U.S. Cl. .................. 524/151; 524/291; 252/404
[58] Field of Search ............... 252/404; 524/151, 291

[56] References Cited

U.S. PATENT DOCUMENTS

| | | | |
|---|---|---|---|
| 3,558,554 | 1/1971 | Kuriyama et al. | 524/152 |
| 3,694,395 | 9/1972 | Bain et al. | 524/151 |
| 3,984,372 | 10/1976 | Cottman | 560/140 |
| 4,168,387 | 9/1979 | Cottman | 560/104 |
| 4,321,218 | 3/1982 | Rasberger et al. | 524/151 |
| 4,360,617 | 11/1982 | Muller et al. | 524/151 |
| 4,365,032 | 12/1982 | Yosizato et al. | 524/99 |
| 4,525,514 | 6/1985 | Yachigo et al. | 524/291 |
| 4,562,281 | 12/1985 | Takahashi et al. | 560/140 |
| 4,732,923 | 3/1988 | Takata et al. | 524/291 |
| 4,774,274 | 9/1988 | Takata et al. | 524/291 |

FOREIGN PATENT DOCUMENTS

| 243956 | 11/1987 | European Pat. Off. . |
|---|---|---|
| 61-47723 | 3/1986 | Japan . |
| 62-223248 | 10/1987 | Japan . |

*Primary Examiner*—Veronica P. Hoke
*Attorney, Agent, or Firm*—Stevens, Davis, Miller & Mosher

[57] ABSTRACT

A butadiene polymer composition containing a phenolic compound represented by the formula:

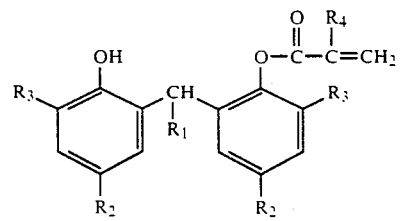

wherein $R_1$ is an alkyl having 1 to 4 carbon atoms, $R_2$ and $R_3$ are each independently a group represented by $-C(CH_3)_2-R'$ in which $R'$ is an alkyl having 1 to 5 carbon atoms or phenyl, and $R_4$ is hydrogen or methyl, and a phosphorus-containing compound represented by the formula:

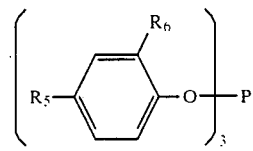

wherein $R_5$ and $R_6$ are each independently an alkyl having 1 to 9 carbon atoms.

The composition is stable against the thermal deterioration and discoloration in the absence of oxygen as well as against the exposure to oxides of nitrogen gas.

16 Claims, No Drawings

BUTADIENE POLYMER COMPOSITION CONTAINING PHENOLIC COMPOUND AND PHOSPHORUS-CONTAINING COMPOUND

BACKGROUND OF THE INVENTION

The present invention relates to a butadiene polymer composition superior in resistance to thermal degradation and discoloration.

Butadiene polymers such as solution-polymerized polybutadiene rubber (BR), solution-polymerized styrene-butadiene copolymer rubber (SBR) and styrene-butadiene block copolymer (SBS) are generally produced by anionic polymerization in a hydrocarbon solvent using a Ziegler catalyst or an organolithium compound as a catalyst. Removal of the solvent from a polymer solution after completion of the polymerization has hitherto been performed by a steam-stripping method, but recently, a method of directly removing the solvent which can theoretically minimize the amount of steam required has been proposed for saving of energy.

However, the latter process is normally carried out at a high temperature of about 150°-200° C. which is considerably higher than the boiling point of polymerization solvents. Therefore, this method suffers from the problems such as gel formation and discoloration of polymers after the high temperature process. Such being the case, there has been desired to improve resistance to thermal degradation and discoloration in the preparation of butadiene polymers, especially in the absence of oxygen.

Furthermore, in extrusion molding or injection molding of SBS or high-impact polystyrenes modified with BR, SBR or SBS, high temperature and high speed processing is required and owing to insufficient thermal resistance, fish eye gel often occurs to cause the problems such as deterioration of film properties and discoloration of the film. Thus, solution of these problems has been earnestly demanded.

It has been well known to use various antioxidants of phenol type, phosphorus type and sulfur type during preparation and processing of butadiene polymers. For example, phenolic antioxidants such as 2,6-di-t-butyl-4-methylphenol, 2,2'-methylenebis(6-t-butyl-4-methylphenol), n-octadecyl 3-(3,5-di-t-butyl-4-hydroxyphenyl)propionate, triethylene glycol bis[3-(3-t-butyl-4-hydroxy-5-methylphenyl)propionate], pentaerythrityl tetrakis[3-(3,5-di-t-butyl-4-hydroxyphenyl)propionate] and 1,3,5-trimethyl-2,4,6-tris(3,5-di-t-butyl-4-hydroxybenzyl)benzene are used alone or in combination with phosphorus type antioxidants such as tris(nonylphenyl) phosphite and distearyl pentaerythrityl diphosphite or in combination with sulfur type antioxidants such as dilauryl thiodipropionate, dimyristyl thiodipropionate, distearyl thiodipropionate and pentaerythrityl tetrakis(3-laurylthiopropionate).

However, these methods are not sufficient to prevent thermal deterioration (gelation) which may occur, especially in the absence of oxygen, at a high temperature process for separation of the polymer from a polymer solution in the preparation of butadiene polymers or at high temperature processing of butadiene polymers.

Further, a phenolic compound represented by the following formula (Ia) has been known as a stabilizer for butadiene polymers.

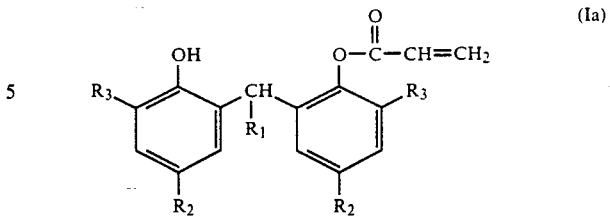

For example, U.S. Pat. No. 4,525,514 discloses a compound of the above formula (Ia) where $R_1$ is hydrogen, $R_2$ is an alkyl of 1-4 carbon atoms and $R_3$ is t-butyl. It mentions that particularly, the compound where $R_2$ is methyl, namely, 2-t-butyl-6-(3-t-butyl-2-hydroxy-5-methylbenzyl)-4-methylphenyl acrylate is effective as a stabilizer for butadiene polymers. This stabilizer exhibits the effect to prevent thermal deterioration (gelation), especially in the absence of oxygen, at a high temperature process for separation of the polymer from a polymer solution in the preparation of butadiene polymers or at high temperature processing of butadiene polymers, but it has become apparent that the use of this stabilizer has the problem in that the separated polymer is practically insufficient in its hue.

Moreover, as an antioxidant for various synthetic resins for preventing discoloration caused by oxidative deterioration in the presence of oxygen, U.S. Pat. No. 4,365,032 has proposed a monoester compound of 2,2'-alkylidenebis(4,6-di-alkyl substituted phenol) including the acrylate represented by the above mentioned formula (Ia). This patent specifies $R_1$ in the formula (Ia) to be hydrogen or an alkyl of 1-10 carbon atoms and $R_2$ and $R_3$ to be an alkyl of 1-4 carbon atoms, a cycloalkyl of 5-6 carbon atoms or a methyl-substituted cycloalkyl of 5-6 carbon atoms. However, this patent makes no mention of preventing discoloration or thermal deterioration (gelation) which may occur, especially in the absence of oxygen, at a high temperature process for separating a polymer from a polymer solution in the production of butadiene polymers or at high temperature processing of butadiene polymers. Besides, the compounds specifically exemplified in the patent showed no sufficient effect to prevent thermal deterioration or discoloration, especially in the absence of oxygen, at a high temperature process in the production of butadiene polymers or at high temperature processing of butadiene polymers.

Furthermore, Japanese Patent Kokai No. 62-223248 has proposed combination use of the phenolic compound represented by the above formula (Ia) with other phenolic compound and/or a phosphorus compound to improve processing stability and discoloration of polyethylene. This patent publication merely mentions stabilization of polyethylene and makes no teaching to stabilize butadiene polymers, especially to prevent the thermal deterioration (gelation) or discoloration in the absence of oxygen.

The patent publication generally defines $R_1$ in the formula (Ia) to be hydrogen or methyl and $R_2$ and $R_3$ to be hydrogen or an alkyl of 1-8 carbon atoms. In its Examples, 2-t-butyl-6-(3-t-butyl-2-hydroxy-5-methylbenzyl)-4-methylphenyl acrylate (a compound of the formula (Ia) where $R_1$ is hydrogen, $R_2$ is methyl and $R_3$ is t-butyl) is used in combination with other phenolic compound and/or a phosphorus compound.

According to the inventors' investigation, when the phenolic compound and the phosphorus compound described in the above patent publication are used in combination for butadiene polymers, effect can be exhibited to some extent against thermal deterioration (gelation) or discoloration caused, especially in the absence of oxygen, at a high temperature process for separating a polymer from a polymer solution in the production of butadiene polymers or at high temperature processing of butadiene polymers, but sufficient effect cannot be exhibited against discoloration due to oxides of nitrogen gas in practical use.

SUMMARY OF THE INVENTION

Under the circumstances, the inventors have made intensive research to develop stabilizers for butadiene polymers effective to prevent thermal deterioration (gelation) and discoloration at a high temperature process for separating a polymer from a polymer solution in the production of the polymers or at high temperature processing of the polymers, especially in the absence of oxygen, and also effective to improve stability of the polymers against the exposure to oxides of nitrogen gas. As a result, it has been found that butadiene polymers containing a phenolic compound of a specific structure and a phosphorus-containing compound of a specific structure are stable against thermal deterioration and discoloration at a high temperature as well as against discoloration in practical use. The present invention has been made based on this finding.

Thus, the present invention provides a butadiene polymer composition comprising a butadiene polymer, a phenolic compound and a phosphorus-containing compound; the phenolic compound being represented by the formula (I):

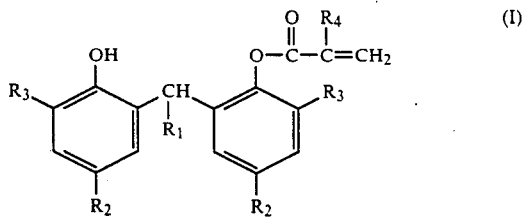

wherein $R_1$ is an alkyl having 1 to 4 carbon atoms, $R_2$ and $R_3$ are each independently a group represented by —C(CH$_3$)$_2$—R' in which R' is an alkyl having 1 to 5 carbon atoms or phenyl, and $R_4$ is hydrogen or methyl, the phosphorus-containing compound being represented by the formula (II):

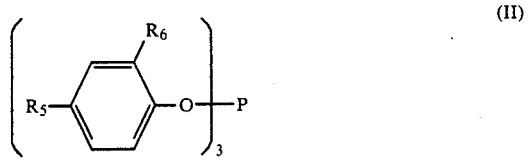

wherein $R_5$ and $R_6$ are each independently an alkyl having 1 to 9 carbon atoms, the weight ratio of the phenolic compound (I) and the phosphorus-containing compound (II) being (I):(II) = 1:0.5–10, and the total amount of the phenolic compound (I) and the phosphorus-containing compound (II) being 0.05 to 3 parts by weight per 100 parts by weight of the butadiene polymer.

The present invention also provides a method for stabilizing a butadiene polymer which comprises incorporating into the butadiene polymer a phenolic compound represented by the above formula (I) and a phosphorus-containing compound represented by the above formula (II), whereby the butadiene polymer is prevented from thermally deteriorating and discoloring in the absence of oxygen and also stabilized against the exposure to oxides of nitrogen gas.

The present invention further provides a stabilizer system comprising 1 part by weight of a phenolic compound represented by the above formula (I) and 0.5 to 10 parts by weight of a phosphorus-containing compound represented by the above formula (II).

DESCRIPTION OF THE INVENTION

The substituent $R_1$ in the phenolic compound represented by the formula (I) is an alkyl having 1–4 carbon atoms, preferably the one having less carbon atoms for preventing the gelation of butadiene polymers at a high temperature, and more preferably methyl.

The substituent $R_2$ is a group represented by —C(CH$_3$)$_2$—R' containing a quaternary carbon atom for preventing the discoloration of butadiene polymers at a high temperature, and is preferably t-butyl, t-amyl or t-octyl.

The substituent $R_3$ is a group represented by —C(CH$_3$)$_2$—R' containing a quaternary carbon atom for preventing the gelation of butadiene polymers at a high temperature, and is preferably t-butyl or t-amyl.

The more preferred are the compounds where $R_2$ and $R_3$ are both t-butyl or both t-amyl.

The ester portion containing the substituent $R_4$ affects the gelation preventing effect for butadiene polymers at a high temperature and when this ester portion is acrylate or methacrylate, the compound exhibits an excellent gelation preventing effect. Thus, $R_4$ in the formula (I) is hydrogen or methyl in which hydrogen is preferred.

Typical examples of the phenolic compounds represented by the formula (I) are shown in the following Table 1.

TABLE 1

| Mark | Structural formula |
|---|---|
| I-1 | 2-[3,5-di-tert-butyl-2-hydroxybenzyl (CH-CH₃ bridge)]-4,6-di-tert-butylphenyl acrylate |
| I-2 | 2-[3,5-di-tert-butyl-2-hydroxybenzyl (CH-CH₃ bridge)]-4,6-di-tert-butylphenyl methacrylate |
| I-3 | 2-[3,5-di-tert-butyl-2-hydroxybenzyl (CH-C₃H₇ bridge)]-4,6-di-tert-butylphenyl acrylate |
| I-4 | 2-[3,5-di-tert-butyl-2-hydroxybenzyl (CH-C₃H₇ bridge)]-4,6-di-tert-butylphenyl methacrylate |
| I-5 | 2-[3-tert-butyl-5-(1,1-dimethylpropyl)-2-hydroxybenzyl (CH-CH₃ bridge)]-6-tert-butyl-4-(1,1-dimethylpropyl)phenyl acrylate |
| I-6 | 2-[3-tert-butyl-5-neopentyl-2-hydroxybenzyl (CH-CH₃ bridge)]-6-tert-butyl-4-neopentylphenyl acrylate |
| I-7 | 2-[3-tert-butyl-5-cumyl-2-hydroxybenzyl (CH-CH₃ bridge)]-6-tert-butyl-4-cumylphenyl acrylate |

TABLE 1-continued

| Mark | Structural formula |
|---|---|
| I-8 | (structure shown) |

Structure I-8: A diphenylmethane derivative with OH and O-C(=O)-CH=CH$_2$ (acrylate ester) groups; substituents CH$_3$CH$_2$(CH$_3$)$_2$C— and C(CH$_3$)$_2$CH$_2$CH$_3$ at ortho and para positions on both rings; central CH linked to CH$_3$.

$R_5$ and $R_6$ in the formula (II) which represents the phosphorus-containing compound are independently of one another an alkyl having 1–9 carbon atoms, preferably an alkyl having 4–9 carbon atoms from the viewpoint of the stability to thermal and oxidative deterioration. t-Butyl is more preferred for $R_5$ and $R_6$.

Representative examples of the phosphorus-containing compounds represented by the formula (II) are shown in Table 2.

TABLE 2

$$\left( R_5 - \underset{R_6}{\underset{|}{\bigcirc}} - O \right)_3 P$$

| Mark | $R_5$ | $R_6$ |
|---|---|---|
| II-1 | —C(CH$_3$)$_3$ | —C(CH$_3$)$_3$ |
| II-2 | —C$_9$H$_{19}$ | —C$_9$H$_{19}$ |

Weight ratio of the phenolic compound of the formula (I) and the phosphorus-containing compound of the formula (II) incorporated into a butadiene polymer is (I):(II)=1:0.5–10, preferably 1:1–4.

Total amount of the phenolic compound of the formula (I) and the phosphorus-containing compound of the formula (II) incorporated into a butadiene polymer is 0.05–3 parts by weight, preferably 0.1–2 parts by weight per 100 parts by weight of the butadiene polymer. When the total amount is less than 0.05 part by weight, the desired effect is insufficiently displayed and when more than 3 parts by weight, the corresponding effect cannot be obtained and this is not economical.

These phenolic compounds of the formula (I) and phosphorus-containing compound of the formula (II) can be incorporated into a butadiene polymer by adding them to a polymerized reaction solution after termination of anionic polymerization reaction. Alternatively, they may be added by dry blending with the butadiene polymer at extrusion molding or injection molding thereof.

The butadiene polymer composition of the present invention contains the phenolic compound of the formula (I) and the phosphorus-containing compound of the formula (II) as stabilizers and, if necessary, may further contain other phenolic compounds and/or other additives such as ultraviolet absorbers, light stabilizers, antioxidants, metal deactivators, metallic soaps, nucleating agents, lubricants, antistatic agents, fire retardants, pigments, and fillers.

Examples of these additives are as follows.
Phenolic antioxidants:
2,6-Di-t-butyl-4-methylphenol,
n-Octadecyl 3-(3,5-di-t-butyl-4-hydroxyphenyl)propionate,
Triethylene glycol bis[3-(3-t-butyl-4-hydroxy-5-methylphenyl)propionate],
Pentaerythrityl tetrakis[3-(3,5-di-t-butyl-4-hydroxyphenyl)propionate],
1,3,5-Trimethyl-2,4,6-tris(3,5-di-t-butyl-4-hydroxybenzyl)benzene,
3,9-Bis{2-[3-(3-t-butyl-4-hydroxy-5-methylphenyl)-propionyloxy]-1,1-dimethylethyl}-2,4,8,10-tetraoxaspiro[5.5]undecane.

Ultraviolet absorbers:
2-Hydroxy-4-methoxybenzophenone,
2-Hydroxy-4-n-octoxybenzophenone,
2-(2-Hydroxy-5-methylphenyl)benzotriazole,
2-(3-t-Butyl-2-hydroxy-5-methylphenyl)-5-chlorobenzotriazole,
2-(3,5-Di-t-butyl-2-hydroxyphenyl)-5-chlorobenzotriazole,
2-(3,5-Di-t-amyl-2-hydroxyphenyl)benzotriazole,
2,4-Di-t-butylphenyl 3,5-di-t-butyl-4-hydroxybenzoate,
[2,2'-Thiobis(4-t-octylphenolate)]/n-butylamine Ni salt.

Hindered amine light stabilizers:
2,2,6,6-Tetramethyl-4-piperidyl benzoate,
Bis(2,2,6,6-tetramethyl-4-piperidyl) sebacate,
Bis(1,2,2,6,6-pentamethyl-4-piperidyl) 2-(3,5-di-t-butyl-4-hydroxybenzyl)-2-n-butylmalonate,
4-[3-(3,5-Di-t-butyl-4-hydroxyphenyl)propionyloxy]-1-[2-{3-(3,5-di-t-butyl-4-hydroxyphenyl)propionyloxy}-ethyl]-2,2,6,6-tetramethylpiperidine,
Polycondensate of dimethyl succinate and 4-hydroxy-1-(2-hydroxyethyl)-2,2,6,6-tetramethylpiperidine,
Poly{[6-(1,1,3,3-tetramethylbutyl)amino-1,3,5-triazine-2,4-diyl][(2,2,6,6-tetramethyl-4-piperidyl)imino]hexamethylene[(2,2,6,6-tetramethyl-4-piperidyl)imino]},
Poly{[6-morpholino-1,3,5-triazine-2,4-diyl][(2,2,6,6-tetramethyl-4-piperidyl)imino]hexamethylene[(2,2,6,6-tetramethyl-4-piperidyl)imino]},
2-Methyl-2-(2,2,6,6-tetramethyl-4-piperidyl)amino-N-(2,2,6,6-tetramethyl-4-piperidyl)propionamide.

Sulfur-containing antioxidants:
Dilauryl thiodipropionate,
Dimyristyl thiodipropionate,
Distearyl thiodipropionate,
Pentaerythrityl tetrakis(3-dodecylthiopropionate),
3,9-Bis(2-dodecylthioethyl)-2,4,8,10-tetraoxaspiro[5.5]undecane.

Butadiene polymers used in the present invention include, for example, solution-polymerized polybutadiene rubber (BR), solution-polymerized styrene-butadiene copolymer rubber (SBR), styrene-butadiene block copolymer (SBS) and high-impact polystyrene (HI-PS) modified with BR, SBR or SBS. These butadiene polymers may be used alone or in combination with other polymers.

The butadiene polymer composition containing the phenolic compound of the formula (I) and the phosphorus-containing compound of the formula (II) is very stable against the gelation and discoloration caused by thermal deterioration especially in the absence of oxygen.

Accordingly, the composition can provide constantly a product free from gelation and discoloration when separating the polymer from a polymer solution after the termination of polymerization reaction. The composition is also stable against the thermal deterioration during the processing such as injection molding and extrusion molding. For example, it can prevent occurrence of fish eye gel during film formation and occurrence of microgel which may cause reduction in gloss or transparency during injection molding, and can provide a high quality product free from discoloration.

Furthermore, the product after processing is also stable against exposure to oxides of nitrogen gas in practical usage and is hardly discolored.

The present invention will be explained in more detail referring to a reference example, examples and comparative examples. However, the present invention should never be limited to these examples.

REFERENCE EXAMPLE 1

In a 2 liter four-necked flask equipped with a thermometer, a stirrer, a condenser and a dropping funnel were charged 438.7 g (1.0 mol) of 2,2'-ethylidenebis(4,6-di-t-butylphenol), 72.1 g (1.0 mol) of acrylic acid, 400 g of n-heptane and 212.5 g (2.1 mol) of triethylamine. Under a nitrogen atmosphere, 107.3 g (0.7 mol) of phosphorus oxychloride was added dropwise with stirring. After completion of the addition, the flask was kept at 80° C. for 1 hour and then 500 g of water was charged therein and the content was washed with the water at 60° C. followed by separation into layers.

The separated oil layer was repeatedly washed with water until the aqueous layer became nearly neutral and then the oil layer was cooled to 5° C. with stirring to precipitate crystals. Stirring was further continued at the same temperature for sufficient precipitation. The crystals were collected by filtration, washed with cold n-heptane and dried under reduced pressure to obtain 468.1 g of white crystalline 2,4-di-t-butyl-6-[1-(3,5-di-t-butyl-2-hydroxyphenyl)ethyl]phenyl acrylate (No. I-1 in Table 1). m.p. 189°–190° C.

| Elemental analysis: $C_{33}H_{48}O_3$ | | |
|---|---|---|
| | Found | (Calcd.) |
| C: | 80.51% | (80.45%) |
| H: | 9.75% | (9.82%) |

Mass analysis (FD-MS): M/Z 493 (M+)

In accordance with the above Reference Example 1, various phenolic compounds represented by the formula (I), for example, the compounds shown in Table 1 can be prepared. Some of them were used in the following Examples. Experiments were also effected using the compounds shown in Table 3 for comparison.

TABLE 3

| Mark | Structural formula |
|---|---|
| AO-1 | 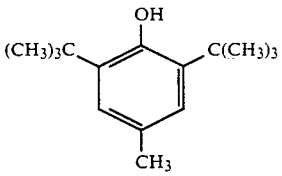 |
| AO-2 | 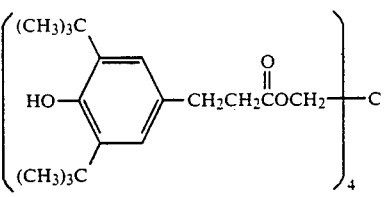 |
| AO-3 | 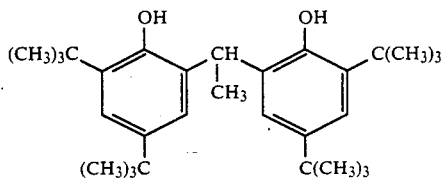 |
| AO-4 | 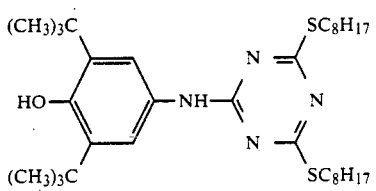 |

TABLE 3-continued

| Mark | Structural formula |
|---|---|
| AO-5 | 2,2'-methylenebis(4-methyl-6-tert-butylphenol) mono-acrylate structure (one phenol -OH, the other -O-C(=O)-CH=CH$_2$, both rings with (CH$_3$)$_3$C and CH$_3$ substituents) |
| AO-6 | {[(CH$_3$)$_3$C, (CH$_3$)$_3$C-phenyl-O]$_2$-P-C$_6$H$_4$-C$_6$H$_4$-P-[O-phenyl-C(CH$_3$)$_3$, C(CH$_3$)$_3$]$_2$} |
| AO-7 | [(CH$_3$)$_3$C, (CH$_3$)$_3$C-phenyl]-O-P(OCH$_2$)$_2$C(CH$_2$O)$_2$P-O-[phenyl-C(CH$_3$)$_3$, C(CH$_3$)$_3$] |

EXAMPLES 1-4 AND COMPARATIVE EXAMPLES 1-21

Polymerization of 1,3-butadiene was effected at 60°–65° C. using n-butyl lithium as a catalyst in n-hexane under a nitrogen atmosphere. After termination of the polymerization with isopropyl alcohol as a terminator, was added thereto a given amount of the test compound shown in Table 4 and then, n-hexane was removed by flash distillation at 190°–200° C. under the nitrogen atmosphere to obtain a polybutadiene rubber composition (BR). Loading amount of the test compound is shown in Table 4 with a unit of part by weight per 100 parts by weight of the polybutadiene.

The resulting polybutadiene rubber compositions were subjected to a kneading test under the following conditions in a nitrogen stream using Laboplastmill (model 40-100 manufactured by Toyo Seiki Co.). Gelation preventing effect at the kneading was evaluated with torque behavior caused by gelation. The results are shown in Table 4. The effect to prevent the gelation is shown by a gelation time required to reach a peak value of the torque and the longer time means the higher effect to prevent the gelation.

| [Conditions of the test using Laboplastmill] | |
|---|---|
| (1) Mixer | Model R-60 |
| (2) Range of torque measured | 0–500 kg-cm |
| (3) Amount of charged composition | 30 g |
| (4) Flow rate of nitrogen gas | 1 l/min |
| (5) Test temperature | 180° C. |
| (6) Revolution | 10 rpm during pre-heating for 3 min; thereafter 60 rpm. |

Furthermore, degree of discoloration of the polybutadiene rubber after the high temperature process for preparation thereof was visually evaluated and shown in Table 4 by the following criteria.

O: No discoloration
Δ: Discoloration in light yellow
x: Discoloration in yellow

The resulting polybutadiene rubber compositions were also subjected to an evaluation test for preventing effect against discoloration due to NOx gas. Thus the compositions were shaped to respective sheets of 2 mm in thickness using rolls of 4 inches at 50° C. and then, the sheets were exposed to oxides of nitrogen gas having a concentration of 1% by volume for 60 minutes using a nitrogen oxide gas testing equipment (manufactured by Suga Tester Co.) which is in accordance with JIS L 0855. Degree of discoloration after the test was visually evaluated and shown in Table 4 by the following criteria.

o: No discoloration
Δ: Discoloration in light yellow
x: Discoloration in yellow

TABLE 4

| Test compound | No. | Example 1 | 2 | 3 | 4 | Comparative Example 1 | 2 | 3 | 4 | 5 | 6 | 7 | 8 | 9 | 10 | 11 | 12 | 13 | 14 | 15 | 16 | 17 | 18 | 19 | 20 | 21 |
|---|---|---|---|---|---|---|---|---|---|---|---|---|---|---|---|---|---|---|---|---|---|---|---|---|---|---|---|
| Phenolic compound | I-1 | 0.2 | 0.2 | | | 0.2 | | | | | | | | | 0.2 | 0.2 | | | | | | | | | | | None |
| | I-8 | | | 0.2 | 0.2 | | 0.2 | | | | | | | | | | 0.2 | | | | | | | | | | |
| | AO-1 | | | | | | | 0.2 | | | | | | | | | | 0.2 | | | | | | | | | |
| | AO-2 | | | | | | | | 0.2 | | | | | | | | | | 0.2 | | | | | | | | |
| | AO-3 | | | | | | | | | 0.2 | | | | | | | | | | 0.2 | | | | | | | |
| | AO-4 | | | | | | | | | | 0.2 | | | | | | | | | | 0.2 | | | | | | |
| | AO-5 | | | | | | | | | | | 0.2 | | | | | | | | | | | | 0.2 | 0.2 | 0.2 | |
| Phosphorus containing compound | II-1 | 0.2 | 0.4 | 0.2 | 0.4 | | | | | | | | 0.2 | | | | | 0.4 | 0.4 | 0.4 | 0.4 | 0.4 | | | | | |
| | AO-6 | | | | | | | | | | | | | 0.2 | | 0.4 | | | | | | | 0.4 | | | | |
| | AO-7 | | | | | | | | | | | | | | 0.2 | | 0.4 | | | | | | | | | 0.4 | |

TABLE 4-continued

| Test compound | Example | | | | Comparative Example | | | | | | | | | | | | | | | | | | | | |
|---|---|---|---|---|---|---|---|---|---|---|---|---|---|---|---|---|---|---|---|---|---|---|---|---|---|
| No. | 1 | 2 | 3 | 4 | 1 | 2 | 3 | 4 | 5 | 6 | 7 | 8 | 9 | 10 | 11 | 12 | 13 | 14 | 15 | 16 | 17 | 18 | 19 | 20 | 21 |
| Gelation time (min) | 63 | 66 | 68 | 71 | 45 | 47 | 8 | 6 | 6 | 7 | 21 | 6 | 5 | 5 | 46 | 47 | 49 | 9 | 7 | 7 | 8 | 24 | 23 | 22 | 5 |
| Discoloration after high temperature process | o | o | o | o | o | o | o | o | Δ | o | Δ | o | Δ | Δ | o | o | o | o | o | Δ | o | o | o | o | x |
| Discoloration after exposure to oxides of nitrogen gas | o | o | o | o | o | o | x | Δ | Δ | x | o | o | x | x | Δ | Δ | Δ | x | Δ | Δ | Δ | o | Δ | Δ | o |

What is claimed is:

1. A butadiene polymer composition comprising a butadiene polymer, a phenolic compound and a phosphorus-containing compound; the phenolic compound being represented by the formula (I):

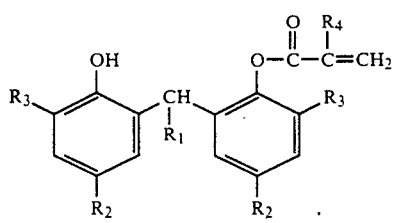

wherein $R_1$ is an alkyl having 1 to 4 carbon atoms, $R_2$ and $R_3$ are each independently a group represented by $-C(CH_3)_2-R'$ in which $R'$ is an alkyl having 1 to 5 carbon atoms or phenyl, and $R_4$ is hydrogen or methyl, the phosphorus-containing compound being represented by the formula (II):

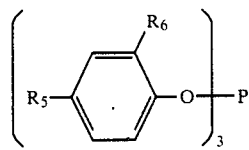

wherein $R_5$ and $R_6$ are each independently an alkyl having 1 to 9 carbon atoms, the weight ratio of said phenolic compound (I) and said phosphorus-containing compound (II) being (I):(II) = 1:0.5-10, and the total amount of said phenolic compound (I) and said phosphorus-containing compound (II) being 0.05 to 3 parts by weight per 100 parts by weight of the butadiene polymer.

2. The composition according to claim 1, wherein $R_1$ in the formula (I) is methyl.

3. The composition according to claim 1, wherein $R_2$ in the formula (I) is t-butyl, t-amyl or t-octyl.

4. The composition according to claim 1, wherein $R_3$ in the formula (I) is t-butyl or t-amyl.

5. The composition according to claim 1, wherein $R_2$ and $R_3$ in the formula (I) are both t-butyl or both t-amyl.

6. The composition according to claim 1, wherein $R_4$ in the formula (I) is hydrogen.

7. The composition according to claim 1, wherein the phenolic compound is

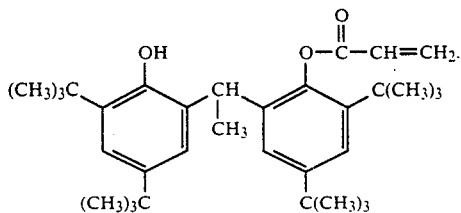

8. The composition according to claim 1, wherein the phenolic compound is

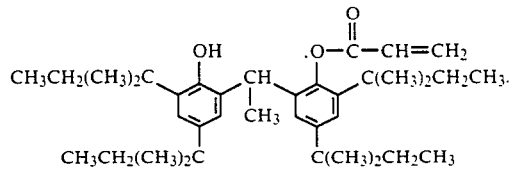

9. The composition according to claim 1, wherein $R_5$ and $R_6$ in the formula (II) are each independently an alkyl having 4 to 9 carbon atoms.

10. The composition according to claim 9, wherein the phosphorus-containing compound is

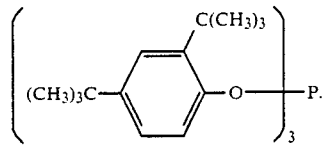

11. The composition according to claim 1, wherein the weight ratio of said phenolic compound (I) and said phosphorus-containing compound (II) is (I):(II) = 1:1-4.

12. The composition according to claim 1, wherein the total amount of said phenolic compound (I) and said phosphorus-containing compound (II) is 0.1-2 parts by weight per 100 parts by weight of the butadiene polymer.

13. The composition according to claim 1, wherein the butadiene polymer is solution polymerized polybutadiene rubber, solution-polymerized styrene-butadiene copolymer rubber or styrene-butadiene block copolymer.

14. A method for stabilizing a butadiene polymer which comprises incorporating into the butadiene polymer a phenolic compound represented by the formula (I):

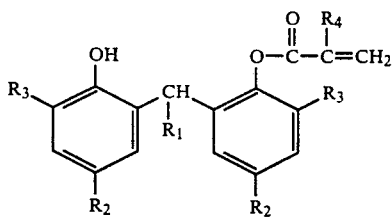

(I)

wherein $R_1$ is an alkyl having 1 to 4 carbon atoms, $R_2$ and $R_3$ are each independently a group represented by —$C(CH_3)_2$—R' in which R' is an alkyl having 1 to 5 carbon atoms or phenyl, and $R_4$ is hydrogen or methyl, and a phosphorus-containing compound represented by the formula (II):

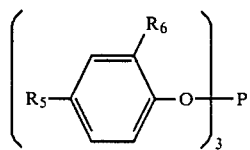

(II)

wherein $R_5$ and $R_6$ are each independently an alkyl having 1 to 9 carbon atoms, whereby the butadiene polymer is prevented from thermally deteriorating and discoloring in the absence of oxygen and also stabilized against the exposure to oxides of nitrogen gas.

15. The method according to claim 14, wherein the butadiene polymer is prepared by anionic polymerization, and the phenolic compound (I) and the phosphorus-containing compound (II) are added to a polymerized reaction solution after the anionic polymerization is terminated.

16. A stabilizer system comprising 1 part by weight of a phenolic compound represented by the formula (I):

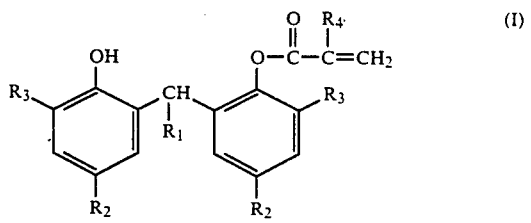

(I)

wherein $R_1$ is an alkyl having 1 to 4 carbon atoms, $R_2$ and $R_3$ are each independently a group represented by —$C(CH_3)_2$—R' in which R' is an alkyl having 1 to 5 carbon atoms or phenyl, and $R_4$ is hydrogen or methyl, and 0.5 to 10 parts by weight of a phosphorus-containing compound represented by the formula (II):

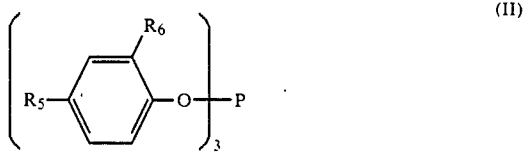

(II)

wherein $R_5$ and $R_6$ are each independently an alkyl having 1 to 9 carbon atoms.

* * * * *